March 16, 1943.  S. E. HILBLOM  2,314,215
MOWER
Filed Sept. 18, 1941  2 Sheets-Sheet 1

Inventor:
Samuel E. Hilblom
By Paul O. Pippel
Atty.

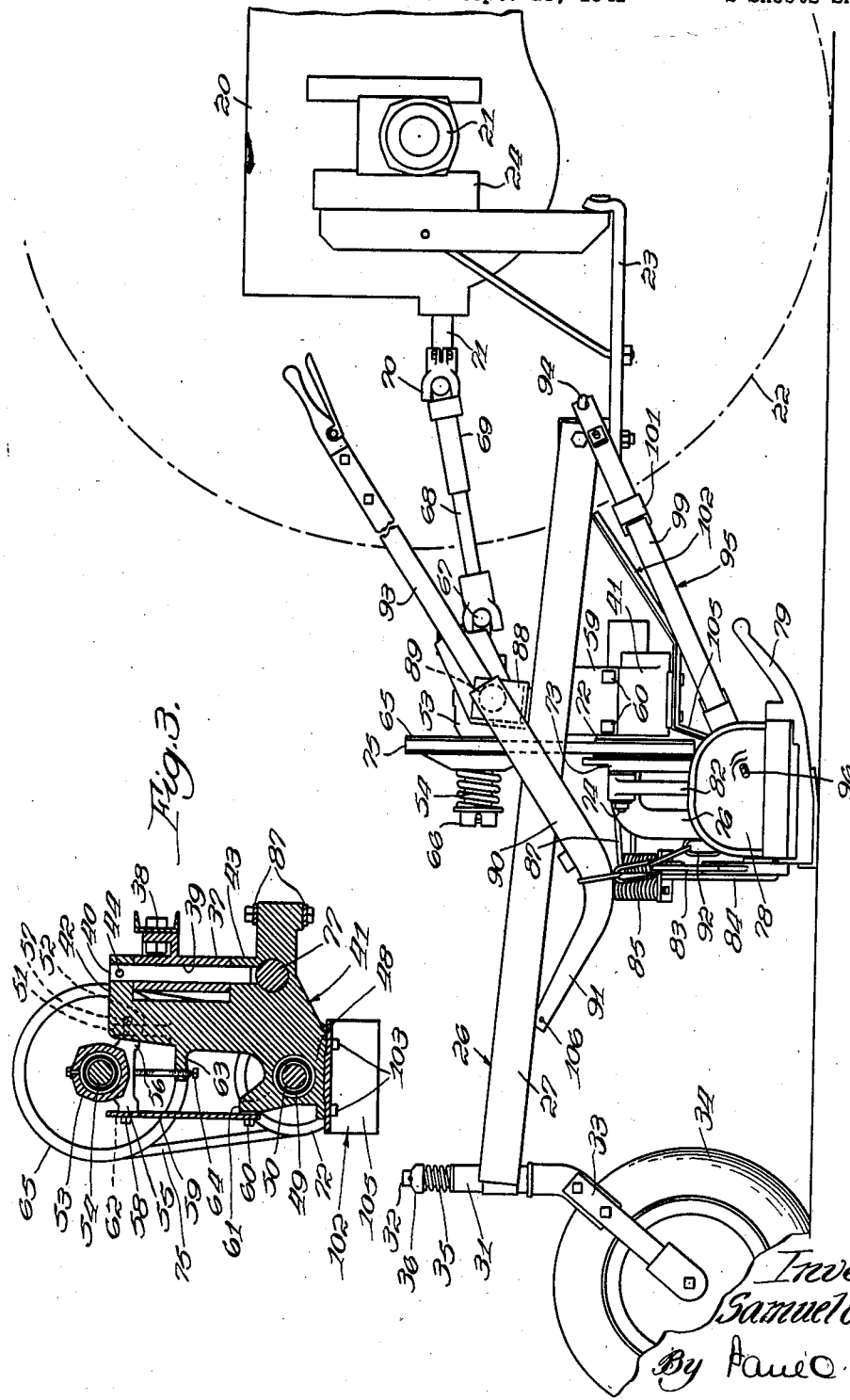

Patented Mar. 16, 1943

2,314,215

UNITED STATES PATENT OFFICE 2,314,215

MOWER

Samuel E. Hilblom, Chicago, Ill., assignor to International Harvester Company, a corporation of New Jersey Application September 18, 1941, Serial No. 411,265

17 Claims. (Cl. 56—25)

This invention relates to a mower and, more particularly, to a mower of the type adapted to be drawn and powered by a tractor.

Tractor mowers may be divided generally into two main classes. In one class of mower, the cutting mechanism for the mower is carried directly and solely by the tractor, and the drive mechanism for the cutting mechanism is connected to a source of power, such as a power take-off shaft on the tractor. The cutting mechanism may further be mounted for rearward swinging movement with respect to the tractor upon the striking of an obstruction by the cutter-bar, releasable means being provided to maintain the cutting mechanism in normal or operative position. In the other class of tractor mowers, the cutting mechanism is carried by a frame, the forward end of which is supported on the tractor and the rearward end of which is supported on a ground-engaging means, such as a caster wheel. The cutting mechanism is driven by the power take-off shaft or other suitable source on the tractor.

This second class of mowers includes two types. One type is exemplified in the patent to Paul No. 1,946,544. As shown in that patent, the forward end of the frame is connected at one corner to the tractor to provide a pivot and at its other corner to provide a releasable latch means. When the cutter-bar strikes an obstruction, the latch connection is released and the entire frame and cutting mechanism, as a unit, swings rearwardly about the pivot connection. The frame, which supports the cutting mechanism, is generally triangular in shape, having its apex at the rear, at which point it is supported by the caster wheel. The apex of the frame is, however, offset laterally with respect to the true center line of the tractor and mower, or, in other words, operates more closely to the right-hand tractor wheel.

The other type of mower is shown, for example, in the patent to Raney et al. No. 2,066,967. This mower is substantially similar to the mower disclosed in the Paul patent referred to above. However, there is one important difference, and that is that the supporting frame is fixed or non-releasable with respect to the tractor, although this frame is mounted so that it has vertical movement with respect to the tractor. The cutting mechanism in this type of mower is carried by the frame for swinging movement rearwardly with respect thereto upon the striking of an obstruction by the cutter-bar, release means being provided for normally holding the cutter-bar in operative position. In a mower of this type, the caster wheel is disposed laterally to one side of the true center line of the tractor and mower.

In either of the types of mowers previously discussed there have been found certain disadvantages. In the mower of the Paul type, considerable expense is involved in providing for the unit swinging of both the frame and cutting mechanism after the cutter-bar strikes an obstruction. In the Raney type of mower, extra expense is involved in providing suitable drive means between the tractor and the cutting mechanism. Heretofore, it has been the practice to provide the supporting frame and the cutting mechanism with two housing parts related for relative pivotal movement and to enclose in these housings shafting and double gears to establish the necessary drive. Rearward swinging movement of the cutting mechanism is accommodated in such construction by the relation between the housings and a vertical shaft coincident with the axis of pivoting. In both types of mowers there have been found certain deficiencies in frame construction, due principally to the mounting of the cutting mechanism and the locating of the caster wheel in the laterally offset position referred to above.

The present invention contemplates and has for its principal object the provision of an improved frame construction for a mower of the type in which the frame is connected at one end to the tractor and is supported at its other end on a ground-engaging means, such as a caster wheel.

An important object of the invention is to provide improved means for supporting the cutting mechanism on the frame.

Another important object is to provide improved means for providing for the pivoting of the cutting mechanism on the frame to accommodate rearward swinging movement of the cutter-bar after an obstruction has been encountered.

Another important object is to provide an improved and inexpensive driving mechanism between the tractor power take-off shaft and the cutting mechanism.

Another object is to provide a unitary supporting structure which is carried on the supporting frame and which includes a plurality of portions journaling drive shafts and supporting the mower coupling or frame bar.

Still another object is to provide means for adjusting one of the drive shafts.

The foregoing and other desirable objects and features of the invention will become apparent to those skilled in the art as the disclosure of the preferred embodiment of the invention is more fully made in the following detailed description and accompanying sheets of drawings, in which:

Figure 2 is a side elevational view of the structure shown in Figure 1; and,

Figure 3 is a sectional view taken substantially on the line 3—3 of Figure 1 and showing the supporting structure or bracket for the drive shafts and the cutting mechanism.

Figure 1:
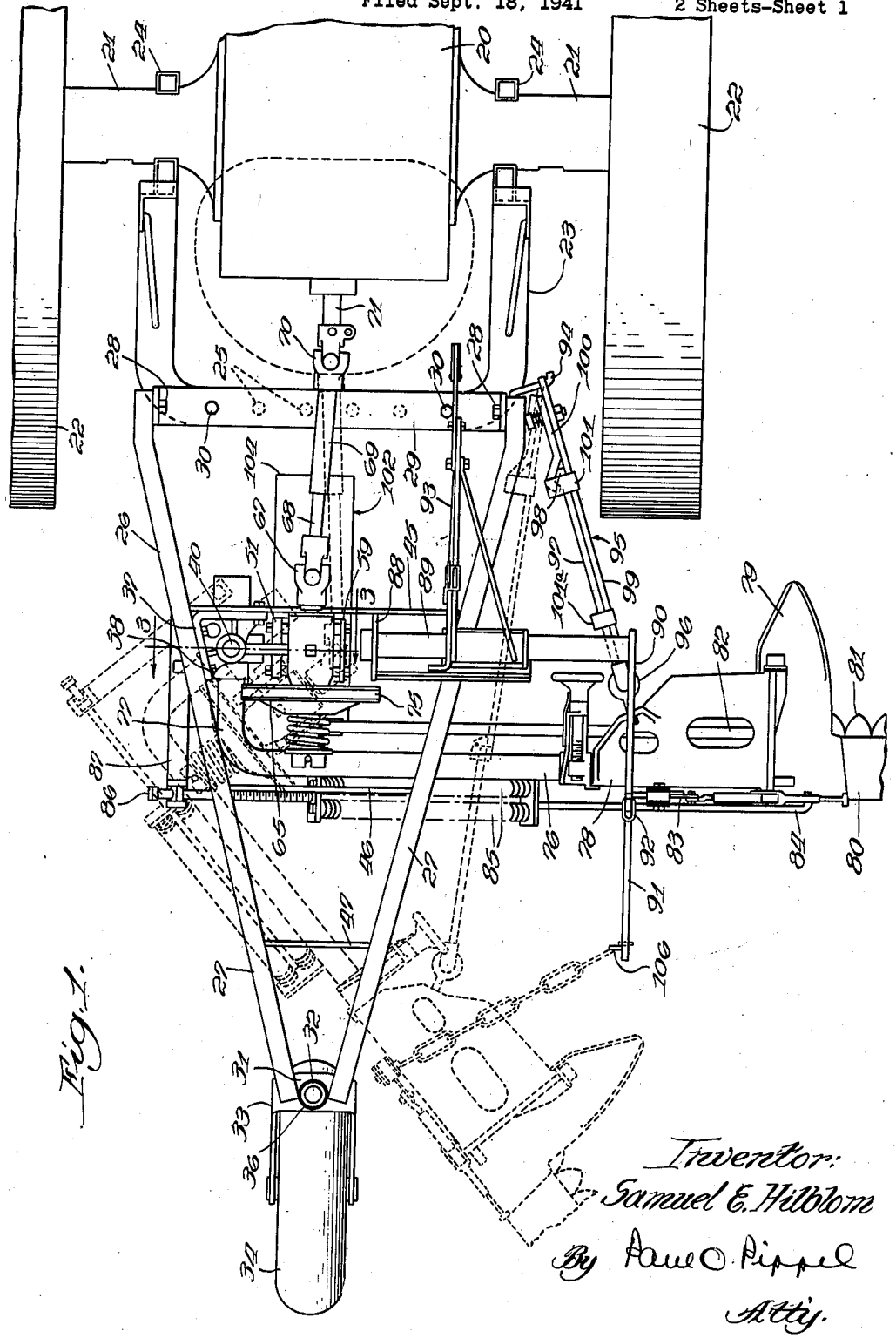
Figure 1 is a plan view of a tractor mower constructed according to the principles of the present invention, there being illustrated in broken lines the position of the cutting mechanism after it has been released upon the striking of an obstruction.

Only the rear portion of a tractor has been illustrated in the drawings. This tractor may be of any suitable type and is shown as including a main frame or body 20 having oppositely extending rear axle housings 21 and right- and left-hand rear drive wheels 22. A draw-bar or equivalent supporting structure 23 is preferably formed as a U, and has each of its legs connected to supporting structure 24 carried by the axle housings 21. The transverse or bight portion of the U-shaped draw-bar is provided with a plurality of openings 25 for providing means by which the mower may be attached.

The preferred form of mower herein illustrated comprises a frame, generally indicated at 26, in the form of an isosceles triangle having opposite legs or frame members 27 extending rearwardly from the tractor. Each of the frame members 27 has its forward end pivotally connected, as at 28, to a transverse bar 29, which is in turn secured by securing means in the form of bolts 30 to the transverse or bight portion of the draw-bar or supporting structure 23. In this manner the base of the triangular frame is disposed at the rear of the tractor and the apex of the triangular structure is spaced longitudinally rearwardly of the tractor. A bracket 31 rigidly connects the ends of the bars 27 together to form the apex of the frame. The frame may also be referred to as having the shape of an A or a V. The bracket 31 provides a bearing for a vertically extending spindle 32 of a yoke or fork 33. The yoke 33 carries a caster wheel 34 which serves as ground-engaging means for supporting the rear end of the frame 26. The upper end of the spindle is provided with a coil compression spring 35, which operates between the bracket 31 and a locking means 36 to provide a resilient mounting for the caster wheel 34.

As best shown in Figures 1 and 3, the intermediate portion of the frame 26, at the left-hand side thereof, rigidly carries a support 37, preferably in the form of a one-piece casting. This support is secured to the left-hand frame bar 27 by bolts 38. As best shown in Figure 3, the support 37 includes a vertical portion provided with a vertical bore 39, which carries a vertically disposed journal member, or pin, 40. The support 37 carries a bracket structure 41 preferably in the form of a unitary casting having upper and lower journal portions 42—43, respectively. Opposite ends of the pin 40 engage these journal members, and the pin is preferably secured to the upper portion 42 by means of a cotter pin or key 44. In this manner the bracket 41 is mounted on the frame on a vertical pivot axis through the pin 40. A transverse supporting bar 45 is rigidly secured at opposite ends to the frame members 27 of the frame 26 and serves as additional support for the support 37. Similar transverse bars 46 and 47 are disposed in longitudinal, spaced position across the frame 26 and serve as bracing members for the frame.

As best shown in Figure 3, the bracket 41 includes a lower portion 48 which extends transversely of the frame 26. This portion is provided with a longitudinally extending bearing 49 which journals a longitudinally extending shaft 50. An upper portion of the bracket 41 includes a vertically disposed attaching portion 51 which is slotted vertically, as at 52. An upper bearing 53 journals an upper or second longitudinal shaft 54. This bearing has oppositely extending, transverse attaching portions 55 and 56. The portion 56 is secured by a bolt 57 to the attaching portion 51 on the bracket 41. The attaching portion 56 is secured by a bolt 58 to a plate or supporting member 59 which has its other end secured, as by a bolt 60, to an attaching portion 61 forming part of the vertically extending portion 48 of the bracket 41. The part of the plate 59 which serves to support the bearing 53 is slotted at 62. The slots in the plate 59 and the attaching portion 51 of the bracket 41 provide means by which the bearing 53 and shaft 54 may be adjusted vertically with respect to the lower shaft 49. An intermediate part of the bracket 41, vertically between the shafts 50 and 54, is provided with a transversely extending flange 63. A threaded screw 64 is threaded through the flange 63 and engages the under side of the bearing 53. This screw provides adjusting means for moving the bearing 53 vertically in order to vary the spacing between the shafts 50 and 54. The purpose of this adjustment will be brought out subsequently.

The shaft 54 provides a drive shaft on which is mounted a drive pulley 65. The slip clutch mechanism 66, which may be of any conventional type, establishes the driving connection between the shaft 54 and this pulley. The forward end of the shaft 54 extends from the bearing 53 and is provided with a yoke member of a universal joint 67, which member is engaged by a complementary yoke member carried at the rearward end of a shaft 68. This shaft is telescopically associated with a shaft 69 which is, in turn, connected by a universal joint 70 to a shaft 71 comprising the power take-off shaft of the tractor. It will be understood that the shaft 69 may be suitably connected to any other convenient source of power on the tractor.

The lower shaft 50 carries at its rearward end a drive pulley 72 and a fly-wheel 73. In a preferred construction, the pulley and fly-wheel are made integral. The fly-wheel is provided with an eccentrically disposed pin 74 which corresponds to the throw of a crank. Means preferably in the form of a V-belt 75 connects the pulleys 65 and 72. It will thus be seen that the structure just described provides driving means between the tractor power take-off shaft and the lower or fly-wheel shaft 50 in the bracket 41. The mower cutting mechanism will next be described.

As best shown in Figures 1 and 3, the cutting mechanism includes a transversely extending coupling or frame bar 76 having its left-hand or stubbleward end bent to provide a longitudinally, forwardly extending portion 77. This portion is journaled or pivoted on a longitudinal horizontal axis in the bracket 41. The right-hand or grassward end of the coupling bar 76 is connected in any suitable manner to a yoke 78. The yoke is in turn connected on a longitudinal horizontal pivot axis to a mower shoe 79. This shoe includes a cutter-bar 80 which may be of any conventional form. The cutter-bar carries a reciprocating sickle or knife 81, the inner end of which is connected in any suitable manner to one end of a pitman 82. The other end of the pitman is connected to the crank pin 74 on the fly-wheel 73, and in this manner the knife or sickle is reciprocated. The yoke 78 carries suitable lifting linkage, generally indicated at 83, for raising and lowering the cutter-bar with respect to the yoke, all of which is generally conventional and is understood by those skilled in the art. One end of a rod 84 is associated with the lifting linkage and the other end of the rod is suitably connected to a pair of tension springs 85, these springs being in turn connected to an adjustable rod 86 having a connection with a rearwardly extending support 87 rigidly carried by the bracket 41 on the frame 26. These springs serve in the usual manner to assist in the raising and balancing of the cutting mechanism.

The right-hand frame member 27 of the frame 26 rigidly carries a supporting structure 88 for journaling a transverse rock-shaft 89. The outer end of the rock-shaft rigidly carries a downwardly and rearwardly extending arm 90, which has its rear portion curved upwardly, as at 91. A lifting chain 92 is connected between the arm 90 and the lifting linkage 83 on the yoke 78. A lifting lever 93 is rigidly carried by the rock-shaft 89 and extends forwardly toward the tractor within reach of an operator who may by that means raise and lower the cutter-bar 80 about its pivotal connection with the yoke 78. The function of the curved portion of the arm 90 will be hereinafter more fully described.

The extreme forward end of the right-hand frame member 27 of the frame 26 includes a transversely extending bracket 94, to which is connected one end of a release mechanism 95. The other end of this mechanism is connected to an eye bolt 96 threaded into the yoke 78. The particular type of release mechanism forms no part of the present invention and will, therefore, be described only generally. This means consists of a first bar 97 having one end connected to the eye bolt 96 and having its other end provided with a detent portion 98. A second bar 99 has a portion lying coextensive with the bar 97 and has its forward end connected to the bracket 94 at the forward end of the frame 26. The forward end of the bar 99 also carries a spring pressed latch 100 engageable with the detent portion 98 on the bar 97. A U-shaped member in the form of a clip 101 is rigidly carried by the bar 99 and is slidably associated with the bar 97. A second U-shaped member in the form of a clip 101ª is rigidly carried by the bar 99 and is slidably associated with the bar 97. As shown in the dotted lines in Figure 1, the detent portion 98 of the bar 97 is released from the latch 100 when the cutter-bar encounters an obstruction or is resisted by a force sufficient to overcome the pressure on the latch.

The transversely extending portion 48 of the bracket 41 serves to carry a shield 102. This shield is secured to the bracket 41 by means of bolts 103 and has an upper and forwardly extending portion 104 and a rearwardly and downwardly extending portion 105. The portion 104 is disposed ahead of the forward part of the bracket structure 41, and the rear portion 105 is disposed ahead of the pulley 72 and pitman 73. There is thus provided an effective shield for protecting the supporting structure and pulley against damage. The shield also prevents the driving mechanism from becoming entangled with uncut crops.

The extreme rearward end of the lifting arm 90 is provided with a pin 106 which serves to prevent disengagement between the arm 90 and the chain 92 as the cutting mechanism swings rearwardly, a further description of which will hereinafter appear.

In the operation of the mower, the tractor and mower are employed as a unit. As previously stated, the forward end of the frame is supported at the rear of the tractor and the rear end of the frame is supported on the caster wheel 34. An important feature of the present invention is the disposition of the caster wheel 34 substantially on the longitudinal center line which passes through the tractor body 20 and through the transversely spaced pivot points 28 at the forward ends of the frame bars 27. This center line is likewise the center line between the transverse spaced drive wheels 22 of the tractor. The frame 26 is thus provided as a balanced structure with a centrally disposed ground-engaging means at its rear. This arrangement provides for better draft as the tractor mower unit is operated. Moreover, since the frame is now a balanced structure, the weight of the cutting mechanism is more evenly distributed on the frame. The inner end of the cutting mechanism is supported through the medium of support 37 and bracket 41. The outer end of the cutting mechanism, of course, travels over the ground in the usual manner, the shoe 79 serving as a ground-engaging runner. When the cutter-bar encounters an obstruction, or its forward progress is otherwise resisted, it is permitted to swing rearwardly because of the release of the release mechanism 95. The cutting mechanism then assumes the position shown in broken lines in Figure 1. As previously stated, the arm 90 of the lifting mechanism has the upwardly curved rear portion 91. When the cutting mechanism is in operative position, the upper link of the chain 92 engages the arm 90 substantially at the bend, as best shown in Figure 2. In this position of the parts, the lifting lever 93 may be rocked to raise and lower the cutter-bar. As the cutter-bar swings rearwardly after being released, the arm 90 is moved downwardly in a counter-clockwise direction so that the portion 91 of the arm assumes generally a horizontal position. The upper link of the chain 92 may then slide rearwardly with respect to the portion 91. The chain cannot become disengaged from the arm and, since the bars of the release mechanism 95 do not come completely apart, it is necessary merely to back the tractor to restore the parts to normal or operative position.

As best shown in Figure 3, the bracket 41 provides a unitary supporting structure which supports the shafts 50 and 54 and the forward portion 77 of the coupling bar 76. The entire bracket structure is mounted in a simple manner on the frame 26 by means of the pin 40 and the support 37. As shown in broken lines in Figure 1, the entire bracket 41, together with the drive shafts 50 and 54, swings rearwardly with the cutting mechanism. This swinging movement is accommodated by the shaft parts 68 and 69 because of the telescopic connection therebetween. These parts do not become completely disconnected and may be restored to normal position upon movement of the tractor and cutting mechanism together. The simple driving connection between the upper pulley 65 and the lower pulley 72 eliminates complicated and expensive shafting and gearing heretofore employed in mowers of the fixed frame and releasable cutting mechanism type.

Certain other advantages of the preferred construction illustrated will become apparent to those versed in the art. It will be understood, of course, that various modifications and alterations may be made in this preferred construction without departing from the spirit and scope of the invention as defined in the appended claims.

What is claimed is:

1. A mower adapted for connection to a tractor, comprising a frame adapted to be disposed at the rear of the tractor and to extend generally longitudinally rearwardly thereof, transversely spaced means at the forward end of the frame adapted to connect the frame to the tractor, ground-engaging means at and for supporting the rear end of the frame, said ground-engaging means being located substantially on a line extended longitudinally rearwardly from a point midway between the aforesaid transversely spaced connecting means, cutting mechanism connected to the frame at one side of said line for movement with respect to the frame, and means associated with the frame and cutting mechanism at the other side of said line for controlling the movement of the cutting mechanism.

2. A mower adapted for connection to a tractor, comprising a frame in the form of a generally isosceles triangle having its base at the rear of the tractor and its apex disposed longitudinally rearwardly of the base, means on the frame adapted to connect the base of the frame to the tractor, ground-engaging means at and for supporting the apex of the frame, cutting mechanism connected to the frame intermediate the base and apex of the frame and to one side of the altitude of said triangle for vertical movement of the cutting mechanism with respect to the frame, and means associated with the frame and cutting mechanism at the other side of the altitude of the triangle for moving the cutting mechanism vertically.

3. A mower adapted for connection to a tractor, comprising a frame adapted to be disposed at the rear of the tractor and to extend generally longitudinally rearwardly thereof, transversely spaced means at the forward end of the frame adapted to connect the frame to the tractor, ground-engaging means at and for supporting the rear end of the frame, said ground-engaging means being located substantially on a line extended longitudinally rearwardly from a point midway between the aforesaid transversely spaced connecting means, cutting mechanism, means pivotally connecting said mechanism to the frame at one side of said line for rearward swinging movement of said mechanism relative to the frame about a substantially vertical axis, and release means connected between the frame and cutting mechanism at the other side of said line for normally restraining said mechanism against said movement.

4. A mower adapted for connection to a tractor, comprising a frame in the form of a generally isosceles triangle having its base at the rear of the tractor and its apex disposed longitudinally rearwardly of the base, means on the frame adapted to connect the base of the frame to the tractor, ground-engaging means at and for supporting the apex of the frame, cutting mechanism, means pivotally connecting said mechanism to the frame at one side of the altitude of the triangle for rearward swinging movement relative to the frame about a substantially vertical axis, and release means disposed at the other side of said altitude and normally restraining said mechanism against said movement.

5. A mower adapted for connection to a tractor having power means, comprising a frame adapted to be positioned at the rear of the tractor and to extend rearwardly thereof, said frame including means adapted to connect the forward end of the frame to the tractor, ground-engaging means at and supporting the rear end of the frame, a support disposed intermediate the ends of the frame, means pivotally connecting the support to the frame for swinging movement with respect thereto about a substantially vertical axis, cutting mechanism carried by the support, a lower shaft journaled in the support, means connecting said shaft to the cutting mechanism, an upper shaft journaled in the support and including means adapted for connection to the tractor power means, means drivingly connecting the two shafts, said support, both shafts, and the cutting mechanism being swingable as a unit about the aforesaid axis, and release means normally restraining said unit against said movement.

6. A mower adapted for connection to a tractor having power means, comprising a frame adapted to be positioned at the rear of the tractor and to extend generally longitudinally rearwardly thereof, said frame including a transversely spaced means adapted to connect the forward end of the frame to the tractor, ground-engaging means at and supporting the rear end of the frame, said ground-engaging means being located substantially on a line extended longitudinally rearwardly from a point midway between the aforesaid transversely spaced connecting means, a support disposed intermediate the ends of the frame, means pivotally connecting the support to the frame for swinging movement with respect thereto about a substantially vertical axis, cutting mechanism carried by the support, a lower shaft journaled in the support, means connecting said shaft to the cutting mechanism, and upper shaft journaled in the support and including means adapted for connection to the tractor power means, means drivingly connecting the two shafts, said support, both shafts and the cutting mechanism being swingable as a unit about the aforesaid axis, and release means normally restraining said unit against said movement.

7. A mower adapted for connection to a tractor having a power means, comprising a frame in the form of a generally isosceles triangle frame having its base at the rear of the tractor and its apex disposed longitudinally rearwardly of the base, means on the frame adapted to connect the base of the frame to the tractor, ground-engaging means at and for supporting the apex of the frame, a support disposed intermediate the ends of the frame, means pivotally connecting the support to the frame for swinging movement with respect thereto about a substantially vertical axis, cutting mechanism carried by the support, a lower shaft journaled in the support, means connecting said shaft to the cutting mechanism, an upper shaft journaled in the support and including means adapted for connection to the tractor power means, means drivingly connecting the two shafts, said support, both shafts and the cutting mechanism being swingable as a unit about the aforesaid axis, and release means normally restraining said unit against said movement.

8. A mower adapted for connection to a tractor having power means, comprising a frame adapted to be positioned at the rear of the tractor and to extend rearwardly thereof, said frame including means adapted to connect the forward end of the frame to the tractor, ground-engaging means at and supporting the rear end of the frame, a single, unitary support disposed intermediate the ends of the frame, means pivotally connecting the support to the frame for swinging movement with respect thereto about a substantially vertical axis, cutting mechanism carried by the support, a driving means carried by the support, means connecting said means to the cutting mechanism, means adapted to connect the driving means to the tractor power means, said support, driving means and the cutting mechanism being swingable as a unit about the aforesaid axis, and release means normally restraining said unit against said movement.

9. A mower adapted for connection to a tractor having power means, comprising a frame adapted to be positioned at the rear of the tractor and to extend rearwardly thereof, said frame including means adapted to connect the forward end of the frame to the tractor, ground-engaging means at and supporting the rear end of the frame, a support disposed intermediate the ends of the frame, means pivotally connecting the support to the frame for swinging movement with respect thereto about a substantially vertical axis, cutting mechanism carried by the support, a lower longitudinal shaft journaled in the support, means connecting said shaft to the cutting mechanism, an upper longitudinal shaft journaled in the support and including means adapted for connection to the tractor power means, means drivingly connecting the two shafts including a pulley on each shaft and a belt around the pulleys, said support, both shafts, pulleys and belt, and the cutting mechanism being swingable as a unit about the aforesaid axis, and release means normally restraining said unit against said movement.

10. A mower adapted for connection to a tractor having transversely spaced rear wheels, comprising an A-frame adapted to be disposed at the rear of the tractor and to extend longitudinally rearwardly thereof with the peak of the A adapted to be disposed substantially on a line extended longitudinally from a point midway between the tractor rear wheels, means carried by the legs of the frame adapted to connect the frame to the tractor, a caster wheel at the peak of the A for carrying the frame, cutting mechanism connected to the frame at one leg of the A for movement of the cutting mechanism with respect to the frame, and means connected between the cutting mechanism and the frame at the other leg of the A for controlling movement of the cutting mechanism.

11. A mower adapted for connection to a tractor having transversely spaced rear wheels and power means, comprising an A-frame adapted to be disposed at the rear of the tractor and to extend longitudinally rearwardly thereof with the peak of the A adapted to be disposed substantially on a line extended longitudinally from a point midway between the tractor rear wheels, means carried by the legs of the frame adapted to connect the frame to the tractor, a caster wheel at the peak of the A for carrying the frame, a bracket rigidly carried by one leg of the frame, a second bracket, means pivotally mounting the second bracket on the first bracket, cutting mechanism, means connecting the cutting mechanism to the second bracket, driving mechanism for the cutting mechanism mounted on the second bracket and including means adapted to connect the driving mechanism to the tractor power means.

12. A mower adapted for connection to a tractor having transversely spaced rear wheels and power means, comprising an A-frame adapted to be disposed at the rear of the tractor and to extend longitudinally rearwardly thereof with the peak of the A adapted to be disposed substantially on a line extended longitudinally from a point midway between the tractor rear wheels, means carried by the legs of the frame adapted to connect the frame to the tractor, a caster wheel at the peak of the A for carrying the frame, a bracket rigidly carried by one leg of the frame, a second bracket having three journal portions, cutting mechanism including a support journaled in one of the journal portions of the second bracket, a pair of shafts journaled respectively in the other journal portions of said second bracket, means drivingly connecting said shafts together, means drivingly connecting one shaft to the cutting mechanism, means adapted to connect the other shaft to the tractor power means, and release means normally restraining the second bracket against pivotal movement with respect to the frame and first bracket.

13. A mower adapted for connection to a tractor having power means, comprising a frame adapted to be positioned at the rear of the tractor and to extend rearwardly thereof, said frame including means adapted to connect the forward end of the frame to the tractor, ground-engaging means at and supporting the rear end of the frame, a support disposed intermediate the ends of the frame, means pivotally connecting the support to the frame for swinging movement with respect thereto about a substantially vertical axis, said support having three journal portions, cutting mechanism including a member journaled in one of the journal portions, a pair of drive elements journaled respectively in the other journal portions, means drivingly connecting said elements together, means drivingly connecting one element to the cutting mechanism, means adapted to connect the other element to the tractor power means, and release means normally restraining the support against pivotal movement with respect to the frame about the aforesaid axis.

14. In a mower having a supporting frame, a bracket, means mounting the bracket on the frame, cutting mechanism carried by the bracket, a first shaft journaled in the bracket, means operatively connecting said shaft to the cutting mechanism, a second shaft paralleling the first shaft and adapted to be connected to a source of driving power, a bearing for said shaft, means mounting said bearing on the bracket for movement toward and away from the first shaft, adjusting means carried by the bracket and engageable with the bearing to adjust the bearing, and means drivingly connecting the two shafts.

15. In a mower having a supporting member and cutting mechanism, a substantially vertical bracket carried by the member, a lower shaft journaled in the bracket and connected to the cutting mechanism, an upper shaft paralleling the lower shaft and adapted to be connected to a source of driving power, drive means connecting said shafts, a bearing carrying the upper shaft, means adjustably mounting the bearing at an upper part of the bracket for movement toward and away from the lower shaft, a flange on the bracket extending transversely between the shafts, and means carried by said flange for adjusting the bearing.

16. In a mower having a supporting member and cutting mechanism, a substantially vertical bracket carried by the member, a lower shaft, an upper shaft paralleling the lower shaft, means journaling one of the shafts in the bracket, a bearing carrying the other shaft, means adjustably mounting the bearing on the bracket, drive means connecting said shafts, means connecting one of the shafts to the cutting mechanism, a flange on the bracket between said shafts, and means carried by the flange for adjusting the bearing.

17. In a mower having a supporting member and cutting mechanism, a substantially vertical bracket carried by the member, said bracket including a transversely extending supporting portion at its lower end, the bracket further including a transversely extending flange spaced above the supporting portion, a lower shaft journaled in the bracket and connected to the cutting mechanism, an upper shaft paralleling the lower shaft, drive means connecting said shafts, a bearing carrying the second shaft, means adjustably mounting the bearing at the upper end of the bracket, means adjustably connecting the bearing to the aforesaid supporting portion of the bracket, and means operative between the bearing and the aforesaid flange for adjusting the bearing.

SAMUEL E. HILBLOM.